Patented Jan. 21, 1936

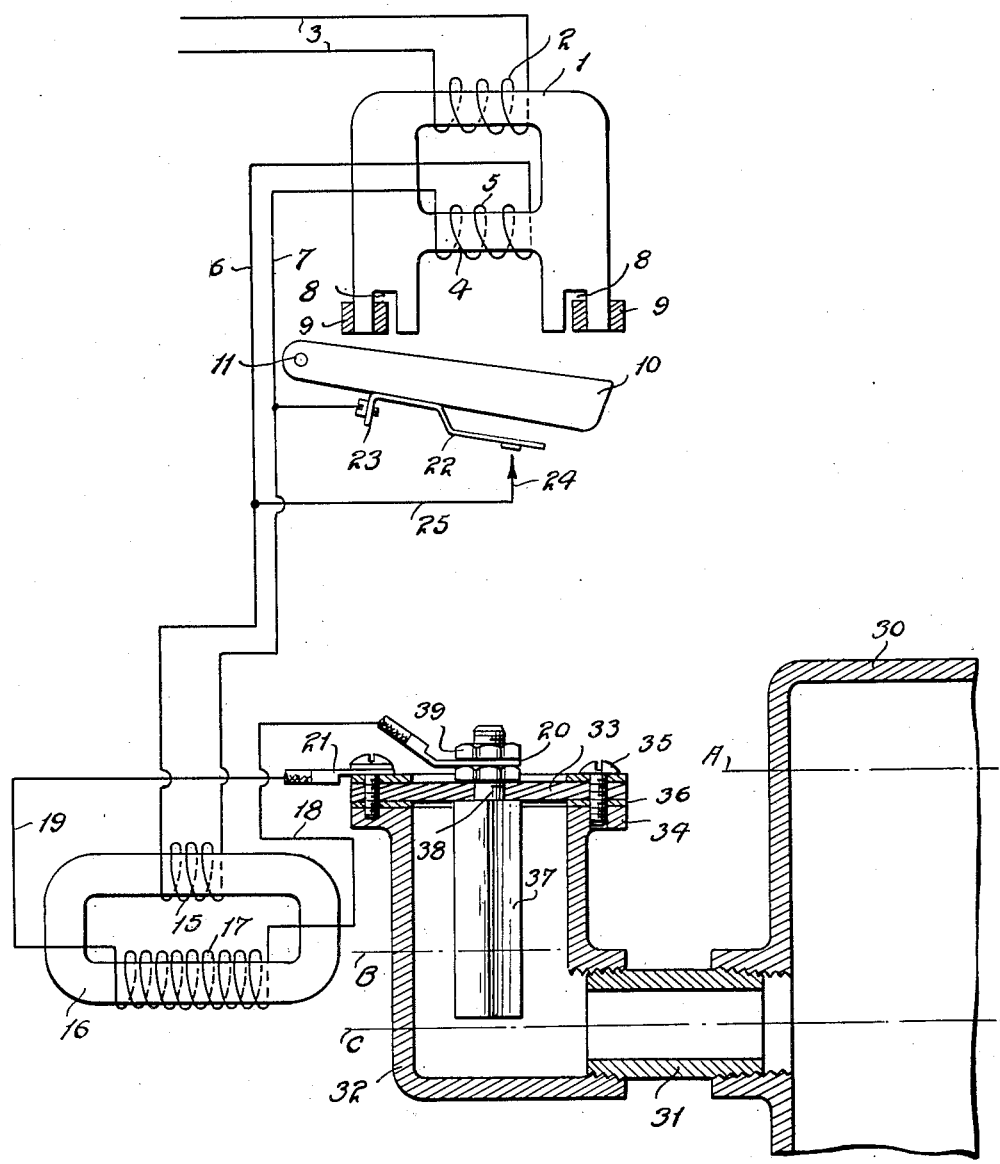

2,028,263

UNITED STATES PATENT OFFICE 2,028,263

ELECTRICAL INDICATING DEVICE

Charles F. Warrick, Detroit, Mich., assignor to Bender Warrick Corporation, Detroit, Mich., a corporation of Michigan Application February 9, 1934, Serial No. 710,414

5 Claims. (Cl. 177—311)

This invention relates to an electrical indicating device and it has to do particularly with an arrangement wherein an electrical indicator or alarm may be located at a place remote from the means relatively to which the indication is given. For example, the indicator may be used to indicate the low level condition of conductive liquid in a boiler or other liquid container and the indicator may be positioned remotely, as for example, as the quarters of an attendant. This, of course, requires the use of electrical conductors extending from the boiler or container to the indicator. The electrical code is such that only low voltages may be used in unconfined conductors such as bell wire or the like, and the conductors of higher voltages are required to be placed in suitable conduits or the like. The present invention aims to provide an arrangement wherein low voltages may be used in the conductors extending from the boiler or container to the indicator with higher voltages used at the indicator or boiler or both. Thus, an installation may be readily made by merely stringing in low voltage wires so that the building need not be torn up for the laying of conduits and so that an installation may be cheaply made.

The drawing illustrates diagrammatically the electrical phase of the invention and shows the mechanical structure of an arrangement for making and breaking contact in accordance with high and low water levels.

A controlling device may be used which may be made along the lines of the device disclosed in my Patent No. 1,979,127 of Oct. 30, 1934, and to this end it may comprise a magnetic core which may advantageously be termed an A-shaped core having a cross bar 1 around which an exciting coil 2 is fashioned having leads 3 arranged to be connected to a source of alternating current. The cross bar of the A, as at 4, may constitute a magnetic shunt and a control coil 5 may be wound therearound having leads 6 and 7. The ends of the legs of the A may constitute poles as at 8 and the poles may be arranged to receive shading coils 9. A movable armature 10 may be pivoted as at 11 and this armature is arranged to be attracted by the poles.

As explained in the aforementioned application the exciting coil sets up a magnetic flux and the easiest flow path for the flux is through the shunt 5. Thus, the magnetic flux is shunted across the legs and the armature is not attracted magnetically. The control coil 5, however, is in a circuit and when this circuit is closed, the potential induced in the control coil sets up magnetic reaction to the flow of flux through the shunt, whereupon the flux finds an easier path across the poles attracting the armature and moving it up against the poles or in close proximity thereto, the armature being arranged to move away from the poles by gravity or spring action when the flux passes through the shunt.

In the present invention a transformer is used in the circuit for the control coil, the wires 6 and 7 being connected to a coil 15 around a core 16. The transformer secondary coil, as shown at 17, is wrapped around the core and conductors 18 and 19 extend therefrom, their ends being connected to a suitable make and break electrode device as at 20 and 21 respectively.

A make and break contact arrangement may be used in the circuit for the coil 5 and associated with the armature so as to make and break this circuit by armature movement. The wire 7 may connect to a contact member 22 fastened to and movable with the armature 10, the connection being illustrated at 23, and the wire 6 may be connected to a contact member 24 through a conductor 25. Thus the make and break contact will be noted as being parallel with the coil 15.

A boiler or any other container in connection with which a certain conductive liquid level is to be maintained is illustrated at 30. Connected into the boiler as by means of a nipple 31 screw threaded into an aperture in the boiler is an electrode chamber 32 which may be screw threaded to the nipple. This chamber is sealed at its open end by a closure disc 33 of non-electrical conducting material such as a phenolic condensation product, the same being attached to the flange 34 of the hollow body 32 by screws 35 and a suitable sealing washer 36 may be used. The connection at 21 may be made by one of the screws 35 so that the hollow body is in electrical association with the coil 17 and in fact constitutes one electrode. Another electrode 37 may have a reduced portion 38 extending through the closure disc 33 and secured thereto by nuts 39 and the connection at 20 may be made between these two nuts. The water at high level may be in the vicinity of the level indicated at A and when the level recedes—say to the level indicated at C, the water leaves the electrode 37 thus breaking the electrical connection between the electrode 37 and the chambered body. Inasmuch as the upper part of the chamber is sealed the water, when at the level A for example, in the boiler, will not be so high in the chamber due to the fact that air or gas above the surface of the water in the chamber is compressed. Thus the level of the water in the electrode chamber may be somewhere in the vicinity of the level indicated at B. However, when the water takes the level C in the boiler it has substantially the same level in the electrode chamber. This particular electrode device is shown in copending application Serial No. 710,413, filed Feb. 9, 1934. While water has been specifically referred to as the liquid whose predetermined low level is to be indicated, it is to be understood that the device may be used with any conducting liquid.

When the liquid level in the boiler is such that the liquid completes the circuit across the electrode 37 and the electrode housing the circuit including the coil 17 is closed. This lowers the reactance on the circuit for the coil 5 allowing a larger amount of induced current to flow and the coil 5 exerts a magnetic reaction to the flow of the flux set up by the exciting coil 2 so that the flow of flux through the shunt is choked off and the flux finds its easiest path across the poles, thus magnetically attracting the armature. Thus the armature is held against or adjacent the poles during high water level. When, however, the level in the boiler recedes to the level C the circuit of the coil 17 is broken. This sets up a high reactance in the circuit for the coil 5, thus lowering the induced current in coil 5, thus reducing the opposition to the flow of flux across the shunt. A sufficiently large portion of the flux now flows across the shunt and the armature is dropped away from the poles. However, when the armature moves away from the poles the circuit for the coil 5 is closed or shorted by the contact made at 22 and 24. The induced current in the coil 5 then exerts a magnetic reactive effect to the flow of flux through the shunt and the flux then is caused to seek a path across the poles raising the armature; this immediately again breaks the circuit for the coil 5 dropping the armature. In this way the armature vibrates at low water level when the electrical connection at the electrode is broken by the liquid.

The boiler may advantageously be in the basement of a building while it may be preferable that the audible indication by armature vibration or other control device be at a remote place, as for example, in an attendant's quarters or in the living quarters of the building. However, a fairly high potential is desired at the electrode so that the liquid may effectively make and break the circuit; for example, 100 volts may be desired at the electrode. In my previous application above referred to the conductors 18 and 19 extended to the magnetic core and connected to the control coil which controls the magnetic shunt. This arrangement, however, requires the stringing of conductors carrying—say—100 volts from the boiler to a remote part of the building and under the code such wires would have to be installed in an expensive way, as for example, in conduits. However, in accordance with the present invention, the conductors 6 and 7 may be laid from the boiler to the remote part of the building and the arrangement may be such that these conductors carry about 20 volts or less. Accordingly, these wires may be in the form of conductors similar to bell wire and may be installed directly without the use of conduit or the like. The transformer comprising the core 16 and coils 15 and 17 are preferably to be located immediately adjacent the boiler or electrode device and the windings are such that the voltage is stepped up to—say—100 volts for the electrode circuit. The examples of 100 volts and 20 volts are given for illustrative purposes only and it is obvious that the invention is not limited to these voltages, the essential thing being that a low voltage is used between the audible indicator or other control device having the armature and the transformer, while a higher voltage is used in the electrode circuit. In copending application Serial No. 710,413, filed Feb. 9, 1934, special forms of structure for vibrating armatures are shown and claimed, but in the form herein the armature 10 does the vibrating which is a sufficient disclosure to illustrate the idea of the use of low voltage circuit between the audible alarm and the boiler, and a higher voltage in the circuit for the electrodes.

I claim:

1. An electrical indicating device comprising in combination, an exciting coil to be permanently connected to a source of alternating current, a core therefor, an armature, said core having a shunt for the magnetic flux set up by the exciting coil, a control coil around the shunt to control the effectiveness of the shunt and in turn control armature movements, conductors leading from the control coil, the voltage in the control coil and in said conductors being relatively low and said conductors being extended to a remote means in connection with which an indication is desired, a step-up transformer having a primary coil connected to said conductors, and a secondary coil in which the induced voltage is relatively high, a circuit for the secondary coil, and an electrode in said circuit to be positioned in a container of liquid to be engaged by high liquid level to close the circuit and to be disengaged at low liquid level to break the circuit.

2. An electrical indicating device comprising in combination, an exciting coil to be permanently connected to a source of alternating current, a core therefor, an armature, a shunt in the core for the magnetic flux set up by the exciting coil, a control coil around the shunt to control the effectiveness of the shunt and in turn control armature movements, conductors leading from the control coil, means controlled by armature movements for effecting an indication, the voltage in the control coil and in the said conductors being relatively low and said conductors being extended to a remote liquid container in connection with which an indication is desired, a step-up transformer adjacent said remote liquid container having a primary coil connected to said conductors, a secondary coil in which the induced voltage is relatively high, a circuit for the secondary coil, and an electrode in said circuit to be positioned in a container for liquid to be engaged by high liquid level to close the circuit and to be disengaged at low liquid level to break the circuit.

3. An electrical indicating device comprising in combination, an exciting coil to be permanently connected to a source of alternating current, a core therefor, an armature, a shunt in the core for the magnetic flux set up by the exciting coil, a control coil around the shunt to control the effectiveness of the shunt and in turn control armature movements, conductors leading from the control coil, the voltage in the control coil and in the said conductors being relatively low and said conductors being extended to a remote means in connection with which an indication is desired and which requires relatively high voltage, a step-up transformer adjacent the remote means having a primary coil connected to said conductors, a secondary coil in which the induced voltage is relatively high, a circuit for the secondary coil, and means in said secondary circuit at the remote means for making or breaking said circuit in response to a condition of which an indication is desired.

4. In combination, a container for a liquid, an electrode which is depending to be contacted with by liquid at high level and to be above the liquid at low level, electrical indicating means comprising, a core having a shunt for magnetic flux and poles, a coil around part of the core connected to a source of alternating current, a second coil around the shunt, an armature adjacent the poles, said armature being attracted toward the poles by the magnetic flux of the first coil when the magnetic shunt is choked, and being substantially unattracted when the shunt is not choked, said indicating means being remote from the liquid container, the voltage in the second coil being relatively low, conductors running from the second coil to a point in proximity to the container, a step-up transformer adjacent the container having a primary winding connected to said conductors, and a secondary winding connected in circuit with said electrode, whereby conductors of relatively low voltage extend between the remote indicating means and container and relatively high voltage is conducted to the electrode.

5. In combination, a container for a liquid, an electrode which is depending and arranged to be contacted with by liquid at high level and to be above the liquid at low level, electrical indicating means comprising, a core having a shunt for magnetic flux and poles, a coil around part of the core connected to a source of alternating current, a second coil around the shunt, an armature adjacent the poles, said armature being attracted toward the poles by the magnetic flux of the first coil when the magnetic shunt is choked, and being substantially unattracted when the shunt is not choked, said indicating means being remote from the liquid container, the voltage in the second coil being relatively low, conductors running from the second coil to a point in proximity to the container, a step-up transformer adjacent the container having a primary winding connected to said conductors, a secondary winding connected in circuit with the electrode whereby conductors of relatively low voltage extend between the remote indicating means and container and relatively high voltage is conducted to the electrode, and means operatively associated with the armature for effecting an indication of the condition of the liquid level upon movement of said armature.

CHARLES F. WARRICK.